UNITED STATES PATENT OFFICE.

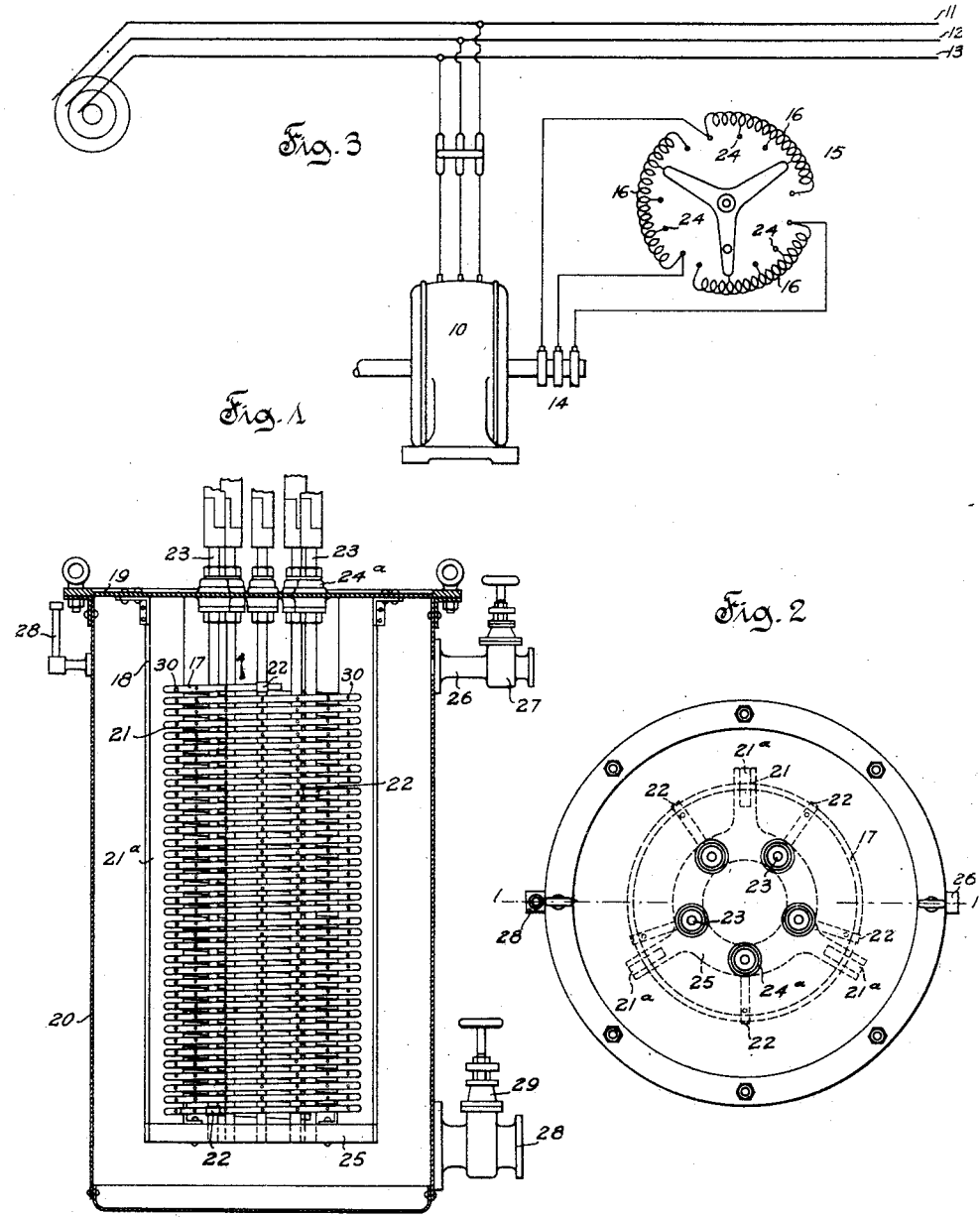

BRADLEY T. McCORMICK, OF MONTREAL, QUEBEC, CANADA, ASSIGNOR, BY MESNE ASSIGNMENTS, TO ALLIS-CHALMERS MANUFACTURING COMPANY, A CORPORATION OF DELAWARE.

STARTING DEVICE FOR ELECTRIC MOTORS.

1,196,254.   Specification of Letters Patent.   Patented Aug. 29, 1916.

Application filed February 21, 1912. Serial No. 679,134.

*To all whom it may concern:*

Be it known that I, BRADLEY T. McCORMICK, a citizen of the United States, residing at Montreal, in the county of Hochelaga and Province of Quebec, Canada, have invented certain new and useful Improvements in Starting Devices for Electric Motors, of which the following is a full, clear, and exact specification.

This invention relates to starting devices for electric motors.

In starting motors or motor-generator sets, especially those equipped with heavy fly-wheels, considerable torque is required. For example, where it is desired to start a motor-generator set provided with a heavy fly-wheel by means of an induction motor of the wound rotor type, a great torque is required. In such case it is necessary to provide the secondary circuit of the starting induction motor with a comparatively high resistance. If the starting resistance were made of cast-iron grids it would be decidedly heavy and expensive.

Such being the case, it is the object of my invention to provide starting devices for electric motors in which the resistance is of maximum value, minimum in weight and which occupies a minimum amount of space.

A further object of my invention is to provide a starting device for electric motors which is simple, compact, and durable, meeting all the requirements of commercial operation.

The various novel features of my invention will be apparent from the description and drawings, and will be particularly set forth in the appended claims.

The invention is illustrated on the accompanying sheet of drawings, in which—

Figure 1 is a longitudinal sectional view taken along the line 1—1 of Fig. 2 of a unit of my new motor starting device. Fig. 2 is a top elevation of said unit; and, Fig. 3 is a diagrammatic view disclosing a rotor-wound induction motor, the secondary of which is provided with my new rheostatic or motor starting device, three of the units shown in Figs. 1 and 2 being connected in star.

As shown in Fig. 3 of the drawings, the induction motor 10 is supplied from mains 11, 12, and 13, and the secondary circuit of said induction motor is connected through slip rings 14 to a starting device or rheostat 15, which includes three separate units 16 of resistance inter-connected. The various sections of each of said units of resistance may be cut into or out of circuit to vary starting or operating conditions of the induction motor. This induction motor may be used for driving any load for which use it is adapted.

Where an induction motor is used for starting up systems of great inertia, such as generators or motor-generator sets equipped with heavy fly-wheels, it is necessary that the secondary circuit of the induction motor be provided with an adjustable resistance of comparatively high value. The commercial problem is to produce the lightest and most durable resistance having a maximum desired value and which occupies minimum space. To meet all of these desirable features, I have provided a starting resistance preferably in the form of a hollow member or seamless tube or coil 17 of small cross-sectional area, which is supported in a frame 18 suspended from a cover 19 of a tank 20. The tube 17 is preferably in the form of a coil and passes through openings 21 in the members 21ª forming the sides of the supporting frame 18, which, being suspended from the cover, can be removed with the resistance coil 17 as a unit from the tank at any time. Preferably, each unit as shown in Fig. 1 forms one leg of an inter-connected resistance in the secondary circuit of the induction motor. In other words, the starting resistance includes three of the units illustrated in Fig. 1. The resistance coil 17 is provided with a plurality of taps 22 from which leads 23 extend to contacts 24 on the face plate of the rheostat. These leads pass through the cover 19 of the tank 20 and are insulated therefrom by bushings 24ª. Within the tank the leads 23 take the form of rods which are supported at one end in a member 25 which forms the bottom portion of the frame 18.

Preparatory to starting the motor 10 with its load, the tank 20 is filled with water or any other fluid cooling medium through an inlet 26, which is provided with a valve 27. The water or insulating fluid completely immerses the resistance coil, and the level of the cooling medium, if it be a liquid, can be observed from an indicating gage 28 connected to the upper part of the tank 20. In the commercial design of such a resistance, it is intended that the tank shall hold enough water to absorb, without reaching the boiling point, the total amount of energy for starting the motor under the most extreme conditions. When the motor has come up to speed, the water thus heated is drawn out through an outlet 28, which is provided with a valve 29. The hollow member or tube forming this resistance gives a small cross-sectional area for the resistance of current and a large contact area for the transfer of heat, thus permitting a high resistance with a relatively short length of conductor and a large contact area of water surface. The latter is increased by providing the tube with openings or holes 30 so that the cooling fluid may be in contact with the inside of the tube as well as with the outside thereof. It is to be noted that with this type of rheostat there is a storage of energy in the water during the starting period, and that the water is drawn off after the motor has been started and replaced by a fresh supply of cold water so that the rheostat is again ready for use.

There may be various modifications in the precise form and arrangement herein shown and described, and I aim to cover all such modifications which do not involve a departure from the spirit and scope of my invention as set forth in the appended claims.

What I claim as new is:

1. In a rheostat, a fluid-containing tank having a cover, a frame supported by said cover, said frame comprising a plurality of angularly spaced members, a hollow resistance coil having openings and mounted on said frame, and leads extending from different portions of said resistance coil.

2. In a device of the class described, a tank, a cover therefor, a frame mounted on said cover in position to be suspended in said tank when said cover is in place thereon, a coil peripherally supported on said frame, and a plurality of terminals extending through said cover, two of said terminals being connected to the ends of said coil.

3. In a rheostat, the combination of a tank and a cover therefor, a resistance element mounted on said cover so as to be contained within said tank when said cover is in place, said resistance element comprising a coil of hollow perforated tubing, and terminal members mounted in said cover and extending into the interior of said coil and into engagement with portions thereof.

4. In a device of the class described, a tank containing fluid, a resistance element immersed in said fluid, said resistance element comprising a coil of hollow perforated tubing, means for supporting said resistance element in place in said tank comprising members engaging peripheral points of said coil, and a plurality of terminals disposed within said coil and engaging points along the periphery of said coil.

5. In a rheostat, the combination of a plurality of terminals, resistance elements between adjacent terminals, said elements consisting of sections of a coil, connections between said terminals and common points of adjacent sections, said connections being disposed within said coil, and supporting means for said coil engaging said coil along the periphery thereof.

6. In a device of the class described, a tank and a cover therefor, a resistance element comprising a single coil, means for supporting said coil in position in said tank when said cover is in place on said tank comprising a plurality of angularly spaced members supported by said cover and engaging a plurality of peripheral points along said coil, and a plurality of terminals mounted in said cover and connected with said coil at different points.

7. In a rheostat, the combination of a receptacle, a cover therefor, a resistance element in the form of a helix mounted in said receptacle with its axis perpendicular to the plane of said cover, supporting means for said resistance element mounted on said cover, and a plurality of terminals passing into said receptacle and extending into engagement with different portions of said coil, said supporting means and said terminals being disposed within the helix formed by said resistance element.

8. In a rheostat, the combination of a receptacle, a cover for said receptacle, a resistance element in the form of a coil mounted in said receptacle with its axis substantially perpendicular to the plane of said cover, supporting means for said coil mounted on said cover, and a plurality of terminals mounted on said cover, extending into said receptacle and connected to spaced portions of said coil, said coil, coil-supporting means and said terminals being removable from said receptacle with said cover.

9. In a rheostat, a receptacle adapted to contain liquid resistance material, a cover for said receptacle, a resistance coil adapted to be immersed in the resistance material in said receptacle and having its axis perpendicular to the plane of said cover, and leads entering said receptacle through said cover and connected to spaced portions of said coil, said coil and said leads being removable from said receptacle with said cover.

Milwaukee, Wis., Jan. 8, 1912.

In testimony whereof I affix my signature, in the presence of two witnesses.

BRADLEY T. McCORMICK.

Witnesses:
G. PERCY COLE,
JESSIE M. ALLAN.